(12) United States Patent
Li et al.

(10) Patent No.: US 10,185,148 B2
(45) Date of Patent: Jan. 22, 2019

(54) SHORT-RANGE OPTICAL AMPLIFICATION MODULE, SPECTACLES, HELMET AND VR SYSTEM

(71) Applicant: SHENZHEN DLODLO NEW TECHNOLOGY CO., LTD., Shenzhen (CN)

(72) Inventors: Gang Li, Shenzhen (CN); Weiping Tang, Shenzhen (CN)

(73) Assignee: Shenzhen Dlodlo New Technology Co., Ltd., Shenzhen (CN)

(*) Notice: Subject to any disclaimer, the term of this patent is extended or adjusted under 35 U.S.C. 154(b) by 114 days.

(21) Appl. No.: 15/300,391

(22) PCT Filed: Mar. 21, 2016

(86) PCT No.: PCT/CN2016/076937
§ 371 (c)(1),
(2) Date: Sep. 29, 2016

(87) PCT Pub. No.: WO2017/161488
PCT Pub. Date: Sep. 28, 2017

(65) Prior Publication Data
US 2018/0088333 A1    Mar. 29, 2018

(51) Int. Cl.
*G02B 27/28* (2006.01)
*G02B 27/01* (2006.01)
(Continued)

(52) U.S. Cl.
CPC ........... *G02B 27/0172* (2013.01); *G02B 5/30* (2013.01); *G02B 27/0012* (2013.01);
(Continued)

(58) Field of Classification Search
CPC .......... G02B 5/14; G02B 5/30; G02B 5/3083; G02B 5/3085; G02B 17/00; G02B 17/06;
(Continued)

(56) References Cited

U.S. PATENT DOCUMENTS 3,480,875 A * 11/1969 Pole ..................... H01S 3/101
359/302
6,108,131 A * 8/2000 Hansen ..................... F21V 9/14
359/485.05

(Continued)

FOREIGN PATENT DOCUMENTS

CN          1930511 A      3/2007
CN        104414747 A      3/2015
(Continued)

OTHER PUBLICATIONS

Search Report for PCT/CN2016/076937.

*Primary Examiner* — Loha Ben
(74) *Attorney, Agent, or Firm* — Fay Sharpe LLP

(57) ABSTRACT

The present invention discloses a short-range optical amplification module, which includes, sequentially from the image side to the object side, a reflective polarizing plate, a first phase delay plate, a third lens and a second phase delay plate, wherein the short-range optical amplification module further includes a first lens and/or a second lens that are/is located on either side of any one of the reflective polarizing plate, the first phase delay plate, the third lens and the second phase delay plate. In the third lens, the optical surface adjacent to the second phase delay plate is a transflective optical surface; the reflection surface-containing focal length $f_3$ of the third lens meets the following condition: $1F \leq f_3 \leq 2F$, wherein F is the focal length of the short-range optical amplification module. By performing parameter refining on the $f_3$ that influences the optical amplification effect, the module can keep a small overall thickness while obtaining a large optical amplification effect and it can be applied in a small-size VR device, so that the VR device can realize a wide field angle, a large eyebox and high-quality imaging effect, and hence a better user experience.

16 Claims, 11 Drawing Sheets

(51) Int. Cl.
  *G02B 27/02* (2006.01)
  *G02B 5/30* (2006.01)
  *G02F 1/01* (2006.01)
  *G02B 27/10* (2006.01)
  *G02B 27/00* (2006.01)
  *G06T 3/00* (2006.01)
  *G06T 3/40* (2006.01)
  *G06T 19/00* (2011.01)
  *G02B 27/09* (2006.01)

(52) U.S. Cl.
  CPC ............ *G02B 27/01* (2013.01); *G02B 27/10* (2013.01); *G02B 27/28* (2013.01); *G02F 1/01* (2013.01); *G06T 3/0018* (2013.01); *G06T 3/4053* (2013.01); *G06T 19/006* (2013.01); *G02B 5/3083* (2013.01); *G02B 27/0025* (2013.01); *G02B 27/0977* (2013.01); *G02B 27/286* (2013.01)

(58) Field of Classification Search
  CPC .... G02B 25/00; G02B 25/002; G02B 25/005; G02B 25/007; G02B 27/01; G02B 27/0101; G02B 27/017; G02B 27/0172; G02B 27/0977; G02B 27/10; G02B 27/26; G02B 27/28; G02B 27/281; G02B 27/286; G02B 2027/0116; G02B 2027/0118; G02B 2027/0123; G02B 27/0012; G02B 27/0025; G03B 21/14; G03B 21/2066; G03B 21/2073; G03B 21/208; G02F 1/01; G02F 1/1335; G06T 3/0018; G06T 3/4053; G06T 19/006
  USPC ......... 359/279, 484.01, 484.08, 485.01, 464, 359/465, 629–631, 646, 717, 726, 798; 353/7, 8, 20, 98; 349/11–13, 16, 96, 113
  See application file for complete search history.

(56) References Cited

U.S. PATENT DOCUMENTS

| | | | | |
|---|---|---|---|---|
| 6,208,463 B1* | 3/2001 | Hansen | ................ | G02B 5/3058 349/9 |
| 6,271,969 B1* | 8/2001 | Mertz | ................ | G02B 27/0172 359/489.07 |
| 6,452,724 B1* | 9/2002 | Hansen | ................ | F21V 9/14 359/485.05 |
| 6,680,798 B2* | 1/2004 | Kreuzer | ................ | G02B 5/3083 359/489.03 |
| 6,710,921 B2* | 3/2004 | Hansen | ................ | F21V 9/14 353/20 |
| 6,710,928 B2* | 3/2004 | Roest | ................ | G02B 27/0172 359/631 |
| 6,767,594 B1* | 7/2004 | Miroshin | ................ | G02B 3/005 349/106 |
| 8,009,349 B2* | 8/2011 | McDowall | ............ | G02F 1/0136 359/318 |
| 8,403,488 B2* | 3/2013 | Schuck | ................ | G02B 17/045 349/8 |
| 8,425,041 B2* | 4/2013 | Schuck | ................ | G03B 35/26 349/5 |
| 8,727,536 B2* | 5/2014 | Schuck | ................ | G02B 26/008 353/20 |
| 8,767,284 B2* | 7/2014 | McDowall | ............ | G02F 1/0136 359/320 |
| 9,223,155 B2* | 12/2015 | McDowall | ............ | G02F 1/0136 |
| 9,594,263 B2* | 3/2017 | McDowall | ............ | G02F 1/0136 |
| 9,690,097 B2* | 6/2017 | Tang | ................ | G02B 27/0101 |
| 9,759,915 B2* | 9/2017 | Tang | ................ | G02B 27/0101 |
| 9,933,627 B2 | 4/2018 | Ivane | | |
| 10,018,845 B2* | 7/2018 | Li | ................ | G02B 27/0101 |
| 2012/0147465 A1 | 6/2012 | Ruhle et al. | | |
| 2015/0070773 A1 | 3/2015 | Wang et al. | | |
| 2018/0088332 A1* | 3/2018 | Li | ................ | G06T 3/0018 |
| 2018/0120564 A1* | 5/2018 | Li | ................ | G02B 17/08 |

FOREIGN PATENT DOCUMENTS

| | | |
|---|---|---|
| CN | 105093555 A | 11/2015 |
| CN | 205562977 U | 9/2016 |
| EP | 0718645 A2 | 6/1996 |
| JP | 2000275566 A | 10/2000 |
| JP | 2005148655 A | 6/2005 |
| WO | 2005054906 A2 | 6/2005 |
| WO | 2014129630 A1 | 8/2014 |

* cited by examiner

SHORT-RANGE OPTICAL AMPLIFICATION MODULE, SPECTACLES, HELMET AND VR SYSTEM

FIELD OF THE INVENTION

The present invention relates to the technical field of optical apparatus, and in particular, to a short-range optical amplification module, spectacles, a helmet and a virtual reality (VR) system.

BACKGROUND OF THE INVENTION

At present, a short-range optical amplification modules has already been disclosed. In order to meet the imaging quality requirement, the module usually comprises a plurality of optical devices. As shown in FIG. 1, it includes, sequentially from the image side to the object side, a reflective polarizing plate 01, a first phase delay plate 02, a lens unit 03 and a second phase delay plate 04. In the lens unit 03, the optical surface adjacent to the second phase delay plate 04 is a transflective optical surface. In use, the optical image from the object side is transmissively amplified by the lens unit 03, then reflected by the reflective polarizing plate 01, and again amplified by the lens unit 03, and finally enters the human eye via the reflective polarizing plate 01. In the optical amplification module, the lens unit is the core part that influences the amplification effect on the optical image.

Since each optical device takes a certain amount of installation space, the size and volume of an optical amplification module consisting of a plurality of optical devices are usually both very large, which especially cannot meet the compact and ultrathin structure requirement for an intelligent Virtual Reality (VR). Therefore, a short-range optical module that has high amplification factor in a small space needs to be designed for application in VR devices. Moreover, VR devices focus on providing better user experience, which requires that a VR device should achieve a wide field angle, a large eyebox and high-quality imaging effect, etc. Such technical objects are directly related to the optical features of the above lens assembly.

Therefore, in order to attain the above objects, parameters need to be set for the lens assembly in a short-range optical amplification module, so that the above objects can be realized within the whole range of use of the VR device.

SUMMARY OF THE INVENTION

Embodiments of the invention provide a short-range optical amplification module, thereby the objects may be attained that the short-range optical amplification module can be used in a small-size VR device and the VR device has a wide field angle, a large eyebox and high-quality imaging effect. The present invention further provides a pair of spectacles, a helmet and a VR system.

In order to solve the above technical problems, the embodiments of the invention disclose technical solutions below:

A short-range optical amplification module, which includes a reflective polarizing plate, a first phase delay plate, a third lens and a second phase delay plate that are arranged sequentially, wherein, a first lens is further set on either side of any one of the reflective polarizing plate, the first phase delay plate, the third lens and the second phase delay plate, and a second lens is further set at on either side of any one of the reflective polarizing plate, the first phase delay plate, the third lens and the second phase delay plate, wherein: in the third lens, the optical surface adjacent to the second phase delay plate is a transflective optical surface; the first focal length $f_3$ of the third lens meets the following condition: $1F \le f_3 \le 2F$, wherein F is the system focal length of the short-range optical amplification module.

In another aspect, in the above short-range optical amplification module, the first focal length $f_3$ of the third lens meets the following condition: $1.5F \le f_3 \le 2F$.

In another aspect, in the above short-range optical amplification module, the focal length $f_{S6}$ of the transflective optical surface meets the following condition: $1.5F \le f_{S6} \le 5F$.

In another aspect, in the above short-range optical amplification module, in the third lens, the focal length $f_{S5}$ of the optical surface adjacent to the second lens meets the following condition: $|f_{S5}| \ge 2F$.

In another aspect, in the above short-range optical amplification module, the system focal length F of the short-range optical amplification module meets the following condition: $10\ mm \le F \le 32\ mm$.

In another aspect, in the above short-range optical amplification module, the focal length $f_2$ of the second lens meets the following condition: $2F \le -f_2$.

In another aspect, in the above short-range optical amplification module, in the second lens, the focal length $f_{S3}$ of the optical surface adjacent to the first lens meets the following condition: $|f_{S3}| \ge 2F$.

In another aspect, in the above short-range optical amplification module, in the second lens, the focal length $f_{S4}$ of the optical surface adjacent to the third lens meets the following condition: $|f_{S4}| \ge 2F$.

In another aspect, in the above short-range optical amplification module, the focal length $f_1$ of the first lens meets the following condition: $4F \le f_1$.

In another aspect, in the above short-range optical amplification module, in the first lens, the focal length $f_{S2}$ of the optical surface adjacent to the second lens is equal to the focal length $f_1$ of the first lens.

In another aspect, in the above short-range optical amplification module, the thickness of the optical amplification module is 8 mm~30 mm.

In another aspect, in the above short-range optical amplification module, the aperture D, through which the light beam that takes part in imaging via the first lens, the second lens and the third lens passes, meets the following condition: $0.3F \le D \le 0.6F$.

In another aspect, in the above short-range optical amplification module, the eye relief of the short-range optical amplification module is 5~10 mm.

Additionally, the invention further provides a pair of spectacles, which includes any of the above short-range optical amplification modules, wherein the spectacles further include a display screen which is set coaxially or noncoaxially with the short-range optical amplification module.

Moreover, the invention further provides a helmet which includes any of the above short-range optical amplification module, wherein the helmet further includes a display screen which is set coaxially or noncoaxially with the short-range optical amplification module.

Finally, the invention further provides a VR system which includes the spectacles or the helmet.

It may be seen from the above technical solutions that, in the short-range optical amplification module according to the invention, parameter refining on the effective focal length of the reflection surface of the third lens which is the core part that influences the optical amplification effect enables the module to keep a small overall thickness while obtaining a large optical amplification effect, so that the module can be applied in a small-size VR device; moreover, the VR device can realize a wide field angle, a large eyebox and high-quality imaging effect, and hence a better user experience.

BRIEF DESCRIPTION OF THE DRAWINGS

These and other objects and features of this invention will become clear from the following description taken in conjunction with the preferred embodiments with reference to the accompanying drawings, in which.

DETAILED DESCRIPTION OF THE EMBODIMENTS

Figure 1:
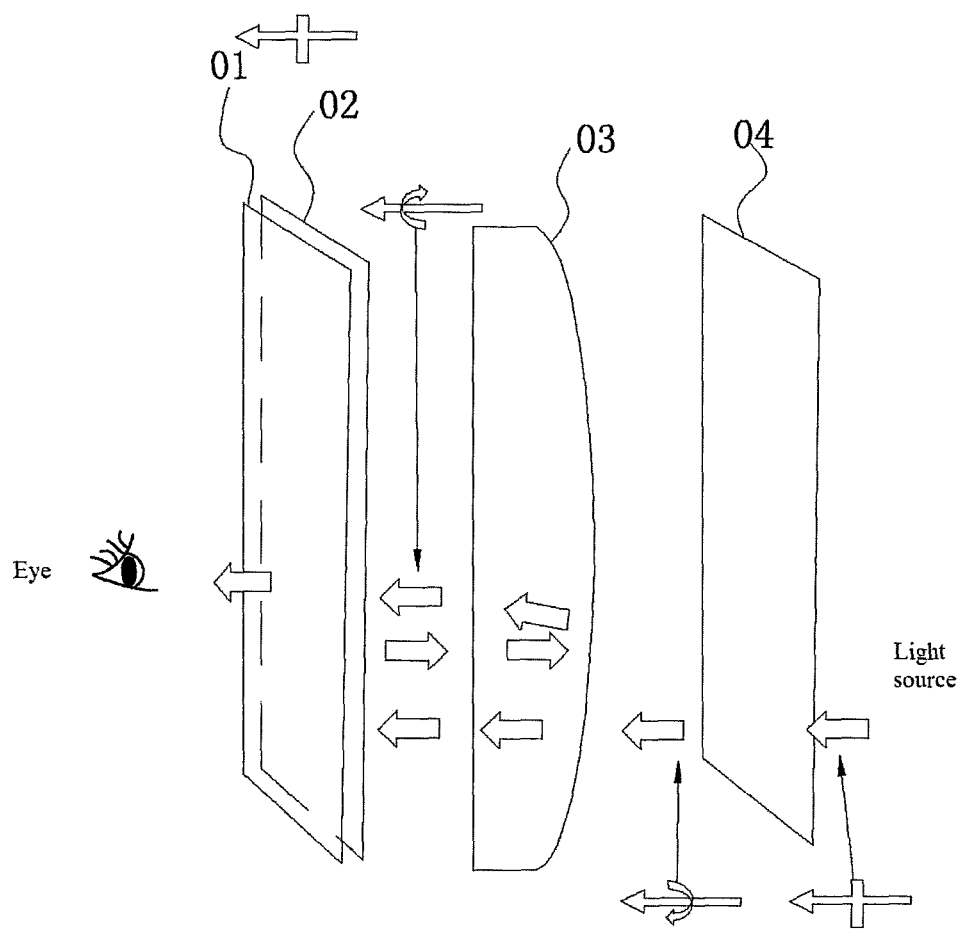
FIG. 1 is a diagram schematically showing the overall construction of a short-range optical amplification module of the prior art.

In order to make one skilled in the art better understand the solutions of the present invention, the embodiments of the invention will be described clearly and fully below with reference to the accompanying drawings. It is obvious that from the teaching of this invention the skilled person may find other embodiments to realize the teaching of the present invention without applying additional inventive activity. These embodiments are still under the scope of the present invention.

Referring to FIG. 2A, FIG. 2B, FIG. 6, FIG. 10 and FIG. 14, they are structural diagrams of the short-range optical amplification modules according to the embodiments of the invention. The short-range optical amplification module includes a reflective polarizing plate, a first phase delay plate, a third lens 30 and a second phase delay plate that are arranged sequentially, wherein, a first lens is further set on either side of any one of the reflective polarizing plate, the first phase delay plate, the third lens 30 and the second phase delay plate, and a second lens is further set on either side of any one of the reflective, polarizing plate, the first phase delay plate, the third lens 30 and the second phase delay plate (see 60 FIG. 6); wherein, the reflective polarizing plate and the first phase delay plate are shown as 50 in FIG. 2A, FIG. 2B, FIG. 10 and FIG. 14, and the display screen is shown as 40. The first lens 10, the second lens 20 and the third lens 30 are the core parts that influence the optical amplification effect, and the system focal length F of the short-range optical amplification module is 10~28 mm; furthermore, the first lens 10, the second lens 20 and the third lens 30 may be attached to each other, or a certain space may exist therebetween.

As defined in this embodiment: in the first lens 10 the optical surface adjacent to the first phase delay plate is a first optical surface E1, and the optical surface adjacent to the second lens 20 is a second optical surface E2; in the second lens 20 the optical surface adjacent to the first lens 10 is a third optical surface E3, and the optical surface adjacent to the second phase delay plate is a fourth optical surface E4; in the third lens 30 the optical surface adjacent to the second lens 20 is a fifth optical surface E5, and the optical surface adjacent to the second phase delay plate is a sixth optical surface E6.

After passing through the second phase delay plate, the third lens 30, the second lens 20, the first lens 10 and the first phase delay plate, an optical image from the object side arrives at the reflective polarizing plate, where it is reflected for the first time, then after passing through the first phase delay plate, the first lens 10, the second lens 20 and the fifth optical surface E5, it arrives at the sixth optical surface E6, where it is reflected for the second time, and then it enters the human eye after passing through the second lens 20, the first lens 10, the first phase delay plate and the reflective polarizing plate. Thus, the optical image may be reflected and amplified twice in the optical amplification module, thereby meeting the requirement of optical amplification.

Wherein, the third lens is the main source of the system optical power. Furthermore, in these embodiments, a first lens 10 and a second lens 20 are set, wherein the two lenses work together to contribute to the system focal length, balance aberration for each other and improve the imaging quality.

In order to be able to realize a wide field angle, a large eyebox, high-quality imaging effect and a compact ultrathin structure when the short-range optical amplification module is applied to an intelligent VR wearable device, the first focal length $f_3$ of the third lens (the focal length of the reflection surface in the third lens) should meet the following condition:

$$1F \leq f_3 \leq 2F, \quad (1)$$

wherein, F is the focal length of the optical system consisting of the first lens, the second lens and the third lens wherein focal length measured after the incident light penetrates the fifth optical surface E5 and is reflected by the sixth optical surface E6 which is defined as the reflection surface-containing focal length $f_3$ of the third lens. The third lens (the effective reflection surface-containing focal length) is the main source of the system optical power. If the optical power is too high, for example, approaching the overall optical power of the system ($f_3 \leq F$), it will be too difficult to correct the aberration; if the optical power is too low ($f_3 \geq 2F$), the optical power burdened on other lenses will be too high, and lenses need to be added to correct the aberration, which is adverse to the compact and lightweight design of the optical system. It is known that the optical power is inversely proportional to the focal length. Preferably, the first focal length $f_3$ of the third lens meets the following condition:

$$1.5F \leq f_3 \leq 2F, \quad (2)$$

wherein the focal length F of the system consisting of the first lens 10, the second lens 20 and the third lens 30 is 10 mm~32 mm. Furthermore, the three lenses may be attached to each other, or a certain space may exist therebetween. The shapes and positional relations of the three lenses are not limited as long as the system focal length is 10 m~32 mm.

The reflection surface-containing focal length of the third lens is defined in the above condition (1). With such a lens cooperating with a screen of 0.9~3 inch, the optical system may thus obtain a wide field angle and allow a high screen resolution, wherein the field angle V is 90°~100°, and the screen resolution is 800*800-4000*4000.

Based on the optimization objects of miniaturizing and lightweighting, the focal length $f_{S6}$ of the sixth optical surface, i.e., the focal length $f_{S6}$ of the transflective surface, is set to meet the following condition:

$$1.5F \leq f_{S6} \leq 5F, \quad (3)$$

wherein, $F_{S6}$ represents the effective focal length reflected by the sixth optical surface. The reflection surface of the sixth optical surface E6 is the main source of the system optical power. If its optical power is too high, for example, approaching the overall optical power of the system ($f_{S6} \leq F$), it will be too difficult to correct the aberration; furthermore, the optical surface will appear too curved and the lens too thick, thereby causing the increase of the thickness of the system, which is adverse to the light and thin design of a VR wearable device. On the contrary, if its optical power is too low ($f_{S6} \geq 5F$), the optical power burdened on other lenses will be too high, and additional lenses need to be added to correct the aberration, which is adverse to the compact and lightweight design of the optical system.

Similarly, based on the optimization objects of miniaturizing and lightweighting, in the above third lens, the focal length $f_{S6}$ of the fifth optical surface meets the following condition:

$$|f_{S5}| \geq 2F. \quad (4)$$

If the focal length $f_{S5}$ is too small, it means that the third lens 30 will be too curved, which is adverse to the aberration correction; furthermore, in conjunction with the second lens 20 and the first lens 10, if the third lens 30 is too curved, it will cause the increase of thickness of the optical system, which is adverse to the light and thin design that a VR wearable device requires.

Similarly, based on the optimization objects of miniaturizing and lightweighting, the focal length $f_2$ of the second negative lens meets the following condition:

$$2F \leq -f_2 \quad (5)$$

If the focal length $f_2$ is too small ($|f_2| \leq 2F$), it means that the second lens 20 will be too curved, and stronger aberration may be introduced to the whole optical system; furthermore, the thickness of the second lens 20 will also be increased, which is adverse to the light and thin design that a VR wearable device requires.

Similarly, based on the optimization objects of miniaturizing and lightweighting, in the second lens 20, the focal length $f_{S3}$ of the third optical surface meets the following condition:

$$|f_{S3}| \geq 2F \quad (6)$$

If the focal length $f_{S3}$ is too small ($|F_{S3}| \leq 2F$), it means that the second lens 20 will be too curved, which is adverse to aberration correction; furthermore, in conjunction with the first lens 10 and the third lens 30, if the second lens 20 is too curved, it will cause the increase of thickness of the optical system, which is adverse to the light and thin design that a VR wearable device requires.

Similarly, based on the optimization objects of miniaturizing and lightweighting, in the second lens 20, the focal length $f_{S4}$ of the fourth optical surface meets the following condition:

$$|f_{S4}| \geq 2F \quad (7)$$

If the focal length $f_{S4}$ is too small ($|F_{S4}| \leq 2F$), it means that the second lens 20 will be too curved, which is adverse to aberration correction; furthermore, in conjunction with the first lens 10 and the third lens 30, if the second lens 20 is too curved, it will cause the increase of thickness of the optical system, which is adverse to the lightweight and ultrathin design of a VR wearable device.

Similarly, based on the optimization objects of miniaturizing and lightweighting, the focal length $f_1$ of the first lens meets the following condition:

$$4F \leq f_1 \quad (8)$$

If the focal length $f_1$ is too small ($|f_1| \leq 4F$), it means that the first lens 10 will be too curved, and stronger aberration will be introduced into the whole system; furthermore, the thickness of the first lens 10 will also be increased, which is adverse to the light and thin design that a VR wearable device requires.

In order to achieve a small and ultrathin VR wearable device, the thickness of the short-range optical amplification module is designed as 8 mm~30 mm.

In consideration of both the comfortability and the imaging quality of the VR device, the eye relief of the short-range optical amplification module is designed as 5 mm~10 mm.

Figure 2A:
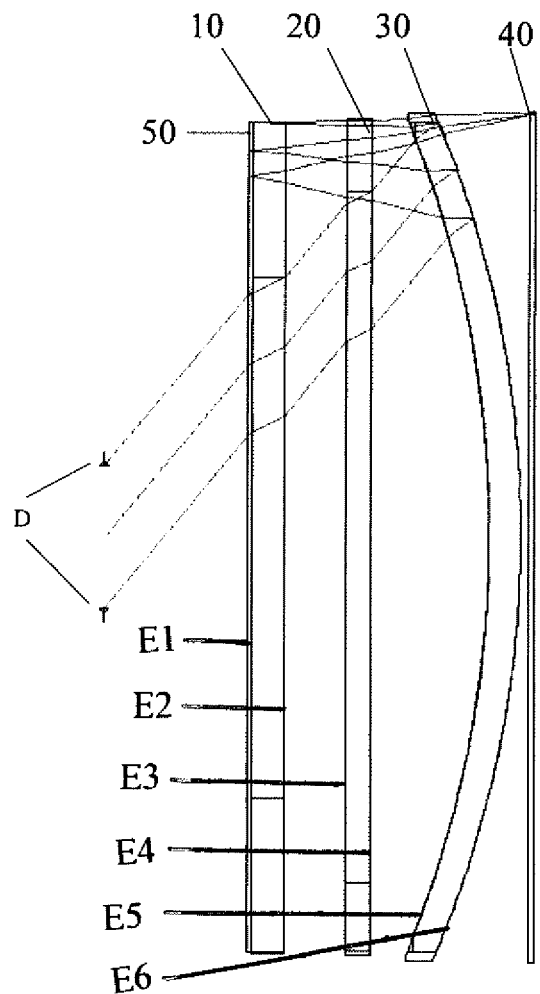
FIG. 2A and FIG. 2B are diagrams schematically showing the overall construction of a short-range optical amplification module according to Embodiment 1 of the invention.

As shown in FIG. 2A, in order to obtain a large eyebox and good imaging quality at the same time, the adjustable range of the aperture on the object side is designed as 1.7F~3.5F, that is, the aperture D, through which the light beam that takes part in imaging via the first lens, the second lens and the third lens passes, meets the following condition:

$$0.3F \leq D \leq 0.6F. \quad (9)$$

Corresponding to equation (5), the eyebox A obtained is 5 mm~9 mm.

Figure 2B:
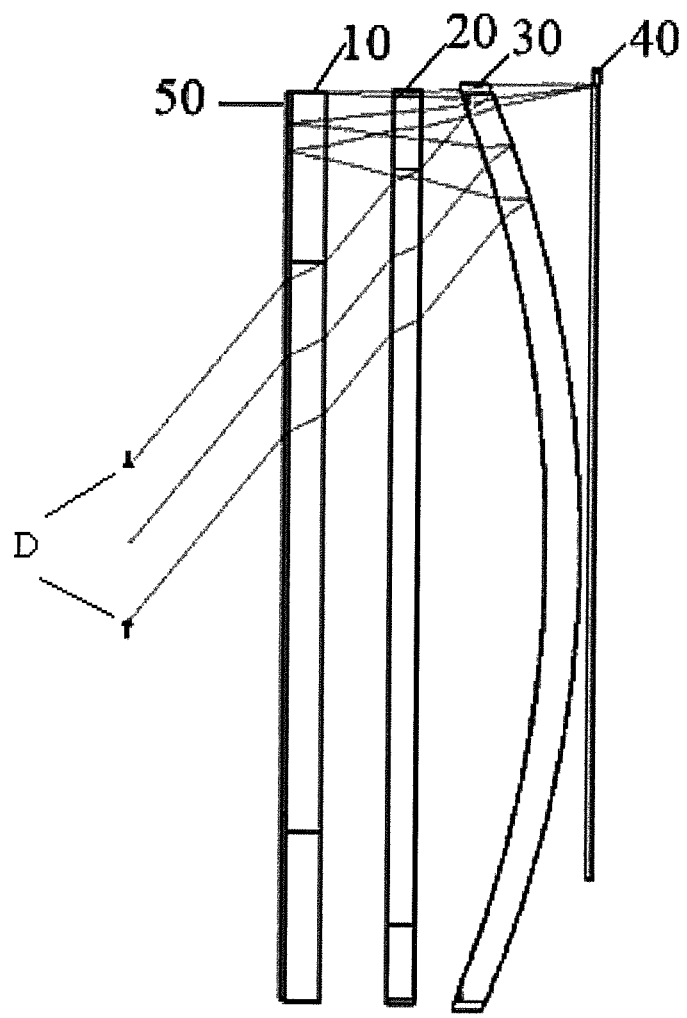

Based on each of the above technical solutions, the short-range optical amplification module thus optimized may be applied to VR spectacles, wherein the spectacles further include a display screen which is set coaxially or noncoaxially with the short-range optical amplification module. FIG. 2A shows the case of coaxial arrangement, and FIG. 2B shows the case of noncoaxial arrangement. The optical amplification effect, the field angle and the eyebox of the module will not be influenced no matter it is coaxial arrangement or noncoaxial arrangement.

Based on each of the above technical solutions, the short-range optical amplification module thus optimized may also be applied to a helmet, wherein the helmet further includes a display screen which is set coaxially or noncoaxially with the short-range optical amplification module.

The short-range optical application module according to the invention may be further applied to a VR system, which may include the above spectacles or the above helmet, or other wearable devices suitable for user experience.

The short-range optical amplification module according to this embodiment will be further illustrated below in conjunction with the tables attached.

In each embodiment, in the specific design parameter table of the first lens 10, the second lens 20 and the third lens 30, OBJ represents an object in the optical system, IMA represents an image in the optical system, STO represents a diaphragm in the optical system, i represents the sequence $(i_0)+1$ of optical surfaces starting from the object side. Light goes from the first lens 10 on the left side to the second lens 20 on the right side and then to the third lens 30, and when it meets a material (Glass) listed as MIRROR, it will be reflected to the reverse direction, and when it is reflected to a second MIRROR, it will be reversed again from left to right, and finally it will reach the image surface.

Embodiment 1

As shown in FIG. 2, in the short-range optical amplification module, the reflection surface-containing focal length $f_3$ of the third lens 30 is designed as equal to the system focal length F.

The specific design parameters of the first lens 10, the second lens 20 and the third lens 30 are as shown in Table 1:

| Surf | Type | Comment | Radius | Thickness | Glass | Diameter | Conic |
|---|---|---|---|---|---|---|---|
| OBJ | STANDARD | | Infinity | Infinity | | 0 | 0 |
| 1 | PARAXIAL | | — | 0 | | 9 | — |
| STO | STANDARD | | Infinity | 9 | | 9 | 0 |
| 3 | STANDARD | | Infinity | 0.3 | BK7 | 30.18156 | 0 |
| 4 | STANDARD | | Infinity | 0 | | 30.53068 | 0 |
| 5 | STANDARD | | Infinity | 2 | H-LAK5A | 30.53068 | 0 |
| 6 | STANDARD | | Infinity | 3.916996 | | 32.57339 | 0 |
| 7 | STANDARD | | Infinity | 1.5 | H-ZF13 | 41.79207 | 0 |
| 8 | STANDARD | | Infinity | 7.45228 | | 43.2142 | 0 |
| 9 | STANDARD | | −68 | 2 | H-LAK10 | 49.68908 | 0 |
| 10 | STANDARD | | −66.19397 | −2 | MIRROR | 51.8908 | 0 |
| 11 | STANDARD | | −68 | 0 | | 51.39615 | 0 |
| 12 | STANDARD | | Infinity | −1.5 | H-ZF13 | 51.52681 | 0 |
| 13 | STANDARD | | Infinity | 3.916996 | | 51.57252 | 0 |
| 14 | STANDARD | | Infinity | −2 | H-LAK5A | 51.78493 | 0 |
| 15 | STANDARD | | Infinity | 0 | | 51.84964 | 0 |
| 16 | STANDARD | | Infinity | −0.3 | BK7 | 51.84964 | 0 |
| 17 | STANDARD | | Infinity | 0.3 | MIRROR | 51.86038 | 0 |
| 18 | STANDARD | | Infinity | 0 | | 51.87111 | 0 |
| 19 | STANDARD | | Infinity | 2 | H-LAK5A | 51.87111 | 0 |
| 20 | STANDARD | | Infinity | 3.916996 | | 51.93582 | 0 |
| 21 | STANDARD | | Infinity | 1.5 | H-ZF13 | 52.14823 | 0 |
| 22 | STANDARD | | Infinity | 7.45228 | | 52.19394 | 0 |
| 23 | STANDARD | | −68 | 2 | H-LAK10 | 52.31433 | 0 |
| 24 | STANDARD | | −66.19397 | 0.5 | | 52.92041 | 0 |
| 25 | STANDARD | | Infinity | 0.3 | BK7 | 53.10254 | 0 |
| 26 | STANDARD | | Infinity | 0 | | 53.10854 | 0 |
| IMA | STANDARD | | Infinity | | | 53.10854 | 0 |

In Table 1, the first row OBJ represents the design parameters related with the object plane; the third row STO represents a diaphragm in the optical system, the aperture of which is 9 mm; the fourth row and the fifth row represent a membrane consisting of a reflective polarizing plate and a first phase delay plate in the optical module, of which the type is STANDARD (standard plane), the material is BK7, the diameter is 30.18156 mm, and the aspheric coefficient is 0; the sixth row and the seventh row respectively represent the data corresponding to the first optical surface E1 and the second optical surface E2 of the first lens 10, the curvature radiuses of the first optical surface E1 and the second optical surface E2 are both infinite, the thickness of the first lens 10 is 2 mm (that is, the distance between the first optical surface E1 and the second optical surface E2, and the thickness value in the sixth row), and the material is H-LAK5A; the eighth row and the ninth row respectively represent the data corresponding to the third optical surface E3 and the fourth optical surface E4 of the second lens 20, the curvature radius of the third optical surface E3 is infinite, the curvature radius of the fourth optical surface E4 is infinite, the thickness of the second lens 20 is 1.5 mm (that is, the distance between the third optical surface E3 and the fourth optical surface E4, and the thickness value in the eighth row), and the material is H-ZF13; the tenth row and the eleventh row respectively represent the data corresponding to the fifth optical surface E5 and the sixth optical surface E6 of the third lens 30, the curvature radiuses of the fifth optical surface E5 and the sixth optical surface E6 are respectively −68 and −66.19397, the thickness of the third lens 30 is 2 mm (that is, the distance between the fifth optical surface E5 and the sixth optical surface E6, and the thickness value in the tenth row), and the material is H-LAK10.

The twelfth row to the twenty-sixth row represent the relevant parameters in the reflection and transmission of light among the membrane, the first lens 10, the second lens 20 and the third lens 30; the twenty-seventh row represents the glass membrane in the liquid crystal layer of the display screen, of which the thickness is 0.3 mm, and the material is BK7; the twenty-eight row IMA represents an image in the optical system.

Other corresponding parameters of the short-range optical amplification module are as shown in Table 2:

TABLE 2

| | |
|---|---|
| Screen size C (inch) | 2.95 |
| Field angle V (°) | 100 |
| System focal length F (mm) | 31.1 |
| Focal length of the transflective surface($f_{s6}$) | 1 F |
| Eyebox A (mm) | 9 |
| Screen resolution | 800*800 |

TABLE 2-continued

| | |
|---|---|
| Optical system thickness (mm) | 17.9 |
| Eye relief (mm) | 9 |
| F# aperture | 3.5 |
| Optical outer diameter (mm) | 62 |
| System distortion D | 30% |
| First focal length $f_3$ of the third lens | 1 F |
| Focal length $f_2$ of the second lens | Infinity |
| Focal length $f_1$ of the first lens | Infinity |

Figure 3:
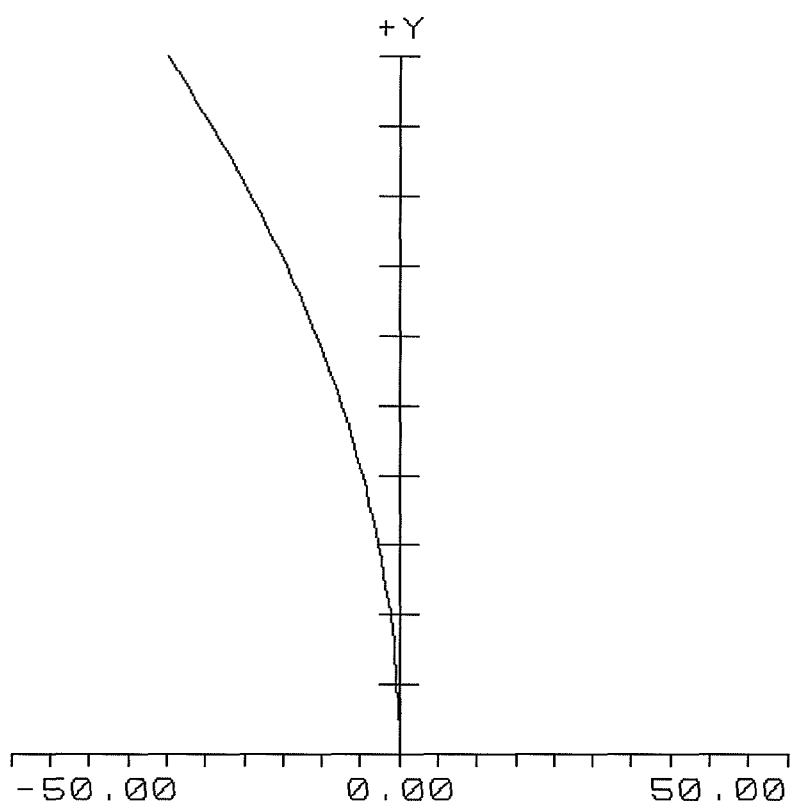
FIG. 3 is a distortion diagram of a short-range optical amplification module according to Embodiment 1 of the invention.
Figure 4:
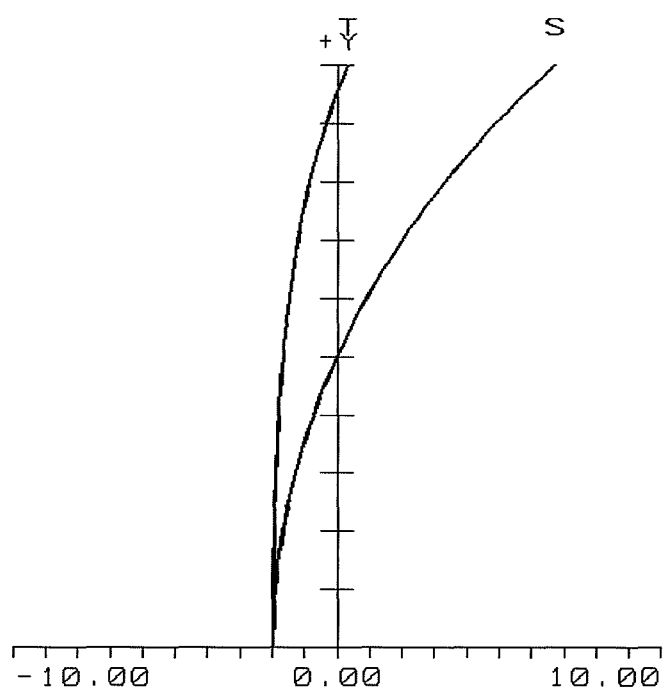
FIG. 4 is a field curvature diagram of a short-range optical amplification module according to Embodiment 1 of the invention.
Figure 5:
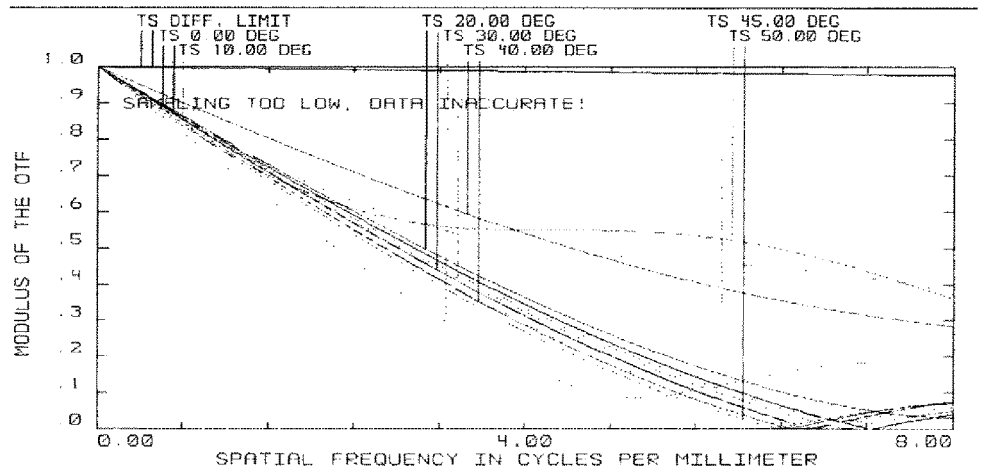
FIG. 5 is an MTF diagram of a short-range optical amplification module according to Embodiment 1 of the invention.

From the MTF diagram of FIG. 5, it may obtain the abscissa (spatial frequency per millimeter) value with an average ordinate (modulation transfer function) higher than 0.18 in each visual field, the distortion factor in FIG. 3 is controlled within a range of (−30%, 0), and the field curvature in FIG. 4 is controlled within the range of (−10 mm, 10 mm), thereby it may be obtained that the resolving power of the short-range optical amplification module may support a resolution of 400*400, that is, when the reflection surface-containing focal length of the third lens is 1F and the focal length $f_{S6}$ is 1F, the module can keep a small overall thickness while obtaining a large optical amplification effect, so that the module can be applied in a small-size VR device, and the VR device can realize a wide field angle of 100°, a large eyebox of 9 mm, high-quality imaging effect with a screen resolution of 800*800, and hence a better user experience.

Embodiment 2

Figure 6:
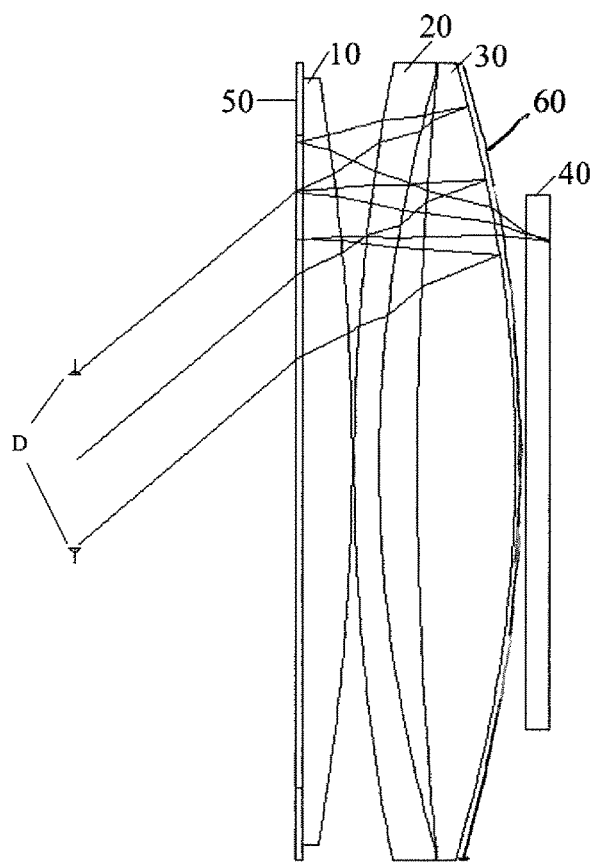
FIG. 6 is a diagram schematically showing the overall construction of a short-range optical amplification module according to Embodiment 2 of the invention.

As shown in FIG. 6, in the short-range optical amplification module, the reflection surface-containing focal length $f_3$ of the third lens 30 is designed as 1.37F (F is the system focal length).

The specific design parameters of the first lens 10, the second lens 20 and the third lens 30 are as shown in Table 3:

TABLE 3

| Surf | Type | Comment | Radius | Thickness | Glass | Diameter | Conic |
|---|---|---|---|---|---|---|---|
| OBJ | STANDARD | | Infinity | Infinity | | 0 | 0 |
| 1 | PARAXIAL | | — | 0 | | 7 | — |
| STO | STANDARD | | Infinity | 9 | | 7 | 0 |
| 3 | STANDARD | | Infinity | 0.3 | BK7 | 26.09264 | 0 |
| 4 | STANDARD | | Infinity | 0 | | 26.42112 | 0 |
| 5 | STANDARD | | Infinity | 2 | H-K9L | 31 | 0 |
| 6 | STANDARD | | −89.75873 | 0.1 | | 31 | 0 |
| 7 | STANDARD | | 84.66267 | 1 | H-ZF11 | 32.2 | 0 |
| 8 | STANDARD | | 54.38812 | 1.558222 | | 31.34 | 0 |
| 9 | STANDARD | | 160.6342 | 4 | D-LAK70 | 32.2 | 0 |
| 10 | STANDARD | | −54.28037 | −4 | MIRROR | 32.2 | 0 |
| 11 | STANDARD | | 160.6342 | 1.558222 | | 32.2 | 0 |
| 12 | STANDARD | | 54.38812 | −1 | H-ZF11 | 31.34 | 0 |
| 13 | STANDARD | | 84.66267 | −0.1 | | 32.2 | 0 |
| 14 | STANDARD | | Infinity | −2 | H-K9L | 31 | 0 |
| 15 | STANDARD | | Infinity | 0 | | 31 | 0 |
| 16 | STANDARD | | Infinity | −0.3 | BK7 | 32.2 | 0 |
| 17 | STANDARD | | Infinity | 0.3 | MIRROR | 32.2 | 0 |
| 18 | STANDARD | | Infinity | 0 | | 32.2 | 0 |
| 19 | STANDARD | | Infinity | 2 | H-K9L | 31 | 0 |
| 20 | STANDARD | | −89.75873 | 0.1 | | 31 | 0 |
| 21 | STANDARD | | 84.66267 | 1 | H-ZF11 | 32.2 | 0 |
| 22 | STANDARD | | 54.38812 | 1.558222 | | 31.34 | 0 |
| 23 | STANDARD | | 160.6342 | 4 | D-LAK70 | 32.2 | 0 |
| 24 | STANDARD | | −54.28037 | 0.4 | | 32.2 | 0 |
| 25 | STANDARD | | Infinity | 1 | BK7 | 21.6526 | 0 |
| 26 | STANDARD | | Infinity | 0 | | 20.68524 | 0 |
| IMA | STANDARD | | Infinity | | | 20.68524 | 0 |

In Table 3, the first row OBJ represents the design parameters related with the object plane; the third row STO represents a diaphragm in the optical system, the aperture of which is 9 mm; the fourth row and the fifth row represent a membrane consisting of a reflective polarizing plate and a first phase delay plate in the optical module, of which the type is STANDARD (standard plane), the material is BK7, the diameter is 26.09264 mm, and the aspheric coefficient is 0; the sixth row and the seventh row respectively represent the data corresponding to the first optical surface E1 and the second optical surface E2 of the first lens 10, the curvature radiuses of the first optical surface E1 and the second optical surface E2 are respectively infinite and −89.75873, the thickness of the first lens 10 is 2 mm (that is, the distance between the first optical surface E1 and the second optical surface E2, and the thickness value in the sixth row), and the material is H-K9L; the eighth row and the ninth row respectively represent the data corresponding to the third optical surface E3 and the fourth optical surface E4 of the second lens 20, the curvature radiuses of the third optical surface E3 and the fourth optical surface E4 are respectively 84.66267 and 54.38812, the thickness of the second lens 20 is 1 mm (that is, the distance between the third optical surface E3 and the fourth optical surface E4, and the thickness value in the eighth row), and the material is H-ZF11. The tenth row and the eleventh row respectively represent the data corresponding to the fifth optical surface E5 and the sixth optical surface E6 of the third lens 30, the curvature radiuses of the fifth optical surface E5 and the sixth optical surface E6 are respectively 160.6342 and −54.28037, the thickness of the third lens 30 is 4 mm (that is, the distance between the fifth optical surface E5 and the sixth optical surface E6, and the thickness value in the tenth row), and the material is D-LAK70.

The twelfth row to the twenty-sixth row represent the relevant parameters in the reflection and transmission of light between the membrane, the first lens 10, the second lens 20 and the third lens 30; the twenty-seventh row represents the glass membrane in the liquid crystal layer of the display screen, of which the thickness is 1 mm, and the material is BK7; the twenty-eight row IMA represents an image in the optical system.

Other corresponding parameters of the short-range optical amplification module are as shown in Table 4:

TABLE 4

| | |
|---|---|
| Screen size C (inch) | 1.15 |
| Field angle V (°) | 96 |
| System focal length F (mm) | 13.84 |
| Focal length of the transflective surface($f_{s6}$) | 2 F |
| Eyebox A(mm) | 7 |
| Screen resolution | 1800*1800 |
| Optical system thickness (mm) | 10.35 |

TABLE 4-continued

| | |
|---|---|
| Eye relief (mm) | 9 |
| F# aperture | 1.98 |
| Optical outer diameter (mm) | 32.2 |
| System distortion D | 30.5% |
| First focal length $f_3$ of the third lens | 1.37 F |
| Focal length $f_2$ of the second lens | −3.3 F |
| Focal length $f_1$ of the first lens | 12.5 F |

Figure 7:
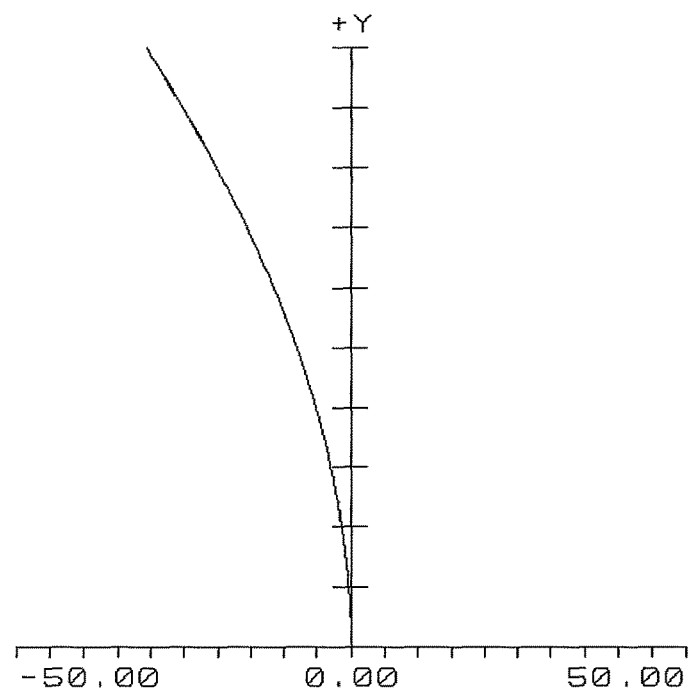
FIG. 7 is a distortion diagram of a short-range optical amplification module according to Embodiment 2 of the invention.
Figure 8:
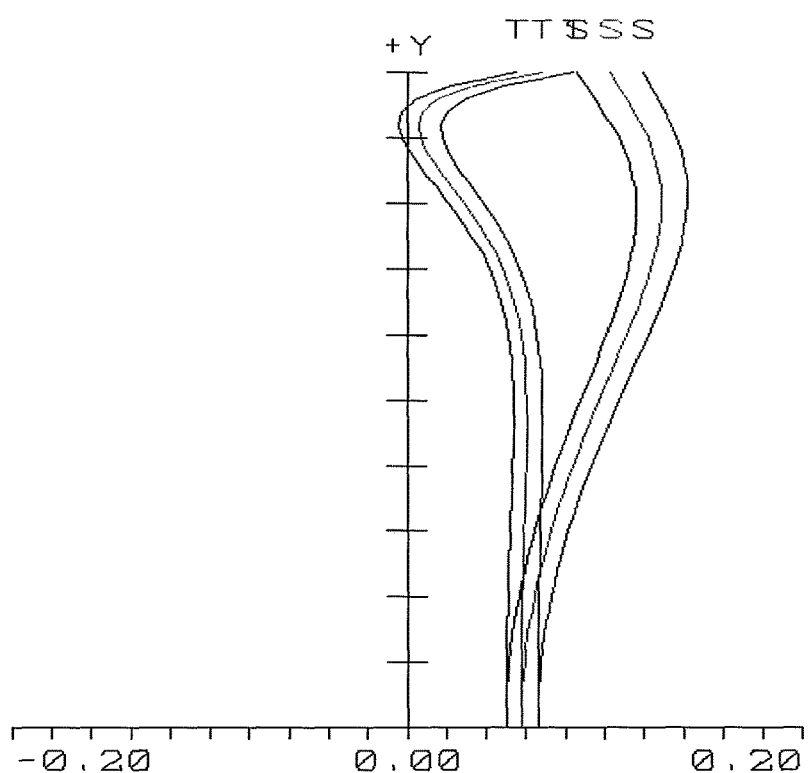
FIG. 8 is a field curvature diagram of a short-range optical amplification module according to Embodiment 2 of the invention.
Figure 9:
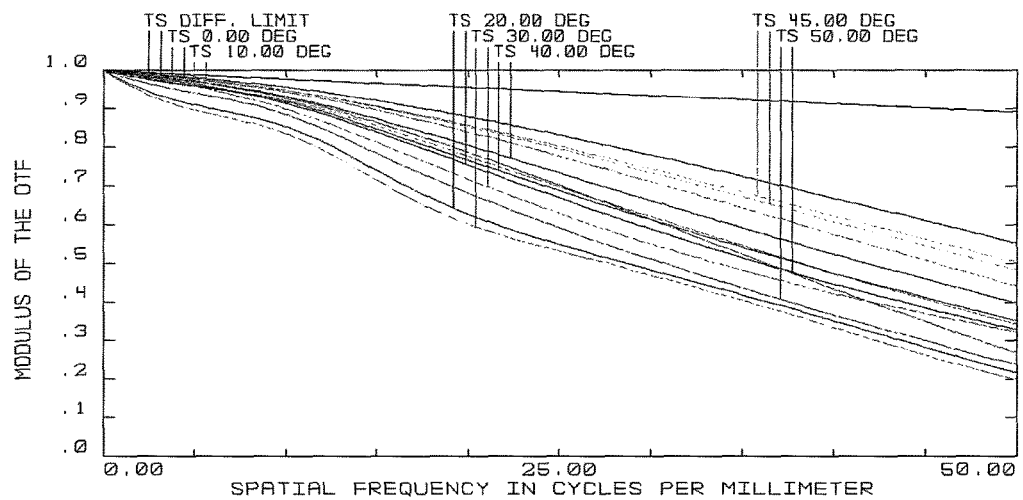
FIG. 9 is an MTF diagram a short-range optical amplification module according to Embodiment 2 of the invention.

From the MTF diagram of FIG. 9, it may obtain the abscissa (spatial frequency per millimeter) value with an average ordinate (modulation transfer function) higher than 0.18 in each visual field, the distortion factor in FIG. 7 is controlled within a range of (−30.5%, 0), and the field curvature in FIG. 8 is controlled within the range of (−0.2 mm, 0.2 mm), thereby it may be obtained that the resolving power of the short-range optical amplification module may support a resolution of 400*400, that is, when the reflection surface-containing focal length of the third lens is 1.37F and the focal length $f_{S6}$ is 2F, the module can keep a small overall thickness while obtaining a large optical amplification effect, so that the module can be applied in a small-size VR device; moreover, the VR device can realize a wide field angle of 96°, a large eyebox of 7 mm, high-quality imaging effect with a screen resolution of 1800*1800, and hence a better user experience.

Embodiment 3

Figure 10:
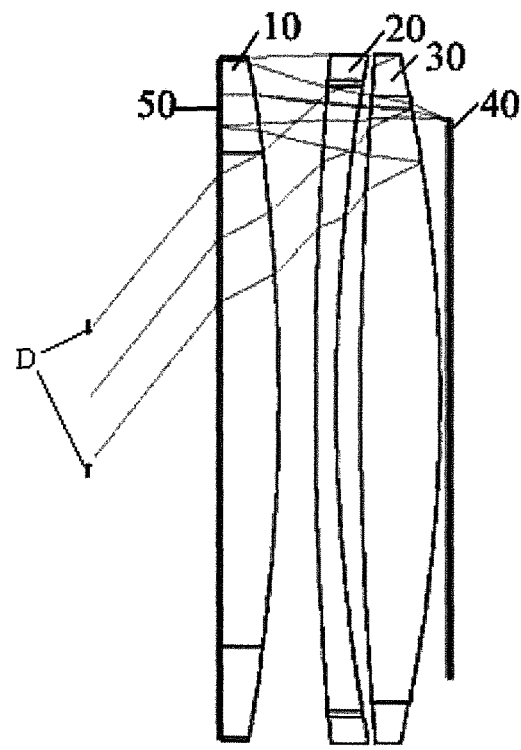
FIG. 10 is a diagram schematically showing the overall construction of a short-range optical amplification module according to Embodiment 3 of the invention.

As shown in FIG. 10, in the short-range optical amplification module, the reflection surface-containing focal length $f_3$ of the third lens 30 is designed as 1.5F (F is the system focal length).

The specific design parameters of the first lens 10, the second lens 20 and the third lens 30 are as shown in Table 5:

TABLE 5

| Surf | Type | Comment | Radius | Thickness | Glass | Diameter | Conic |
|---|---|---|---|---|---|---|---|
| OBJ | STANDARD | | Infinity | Infinity | | 0 | 0 |
| 1 | PARAXIAL | | — | 0 | | 9 | — |
| STO | STANDARD | | Infinity | 9 | | 9 | 0 |
| 3 | STANDARD | | Infinity | 0.3 | BK7 | 30.18156 | 0 |
| 4 | STANDARD | | Infinity | 0 | | 30.53068 | 0 |
| 5 | STANDARD | | Infinity | 4 | H-LAK5A | 30.53068 | 0 |
| 6 | STANDARD | | −126.3604 | 2.51823 | | 33.47865 | 0 |
| 7 | STANDARD | | 252.9636 | 1.5 | H-ZF13 | 41.40807 | 0 |
| 8 | STANDARD | | 123.3701 | 1.701081 | | 43.19258 | 0 |
| 9 | STANDARD | | 269.2846 | 5.5 | H-LAK10 | 44.98185 | 0 |
| 10 | STANDARD | | −101.0977 | −5.5 | MIRROR | 46.69545 | 0 |
| 11 | STANDARD | | 269.2846 | 1.701081 | | 46.59742 | 0 |
| 12 | STANDARD | | 123.3701 | −1.5 | H-ZF13 | 46.49442 | 0 |
| 13 | STANDARD | | 252.9636 | −2.51823 | | 46.6367 | 0 |
| 14 | STANDARD | | −126.3604 | −4 | H-LAK5A | 46.36075 | 0 |
| 15 | STANDARD | | Infinity | 0 | | 46.02962 | 0 |
| 16 | STANDARD | | Infinity | −0.3 | BK7 | 46.02962 | 0 |
| 17 | STANDARD | | Infinity | 0.3 | MIRROR | 45.97037 | 0 |
| 18 | STANDARD | | Infinity | 0 | | 45.91112 | 0 |
| 19 | STANDARD | | Infinity | 4 | H-LAK5A | 45.91112 | 0 |
| 20 | STANDARD | | −126.3604 | 2.51823 | | 45.56688 | 0 |
| 21 | STANDARD | | 252.9636 | 1.5 | H-ZF13 | 42.38623 | 0 |
| 22 | STANDARD | | 123.3701 | 1.701081 | | 41.45218 | 0 |
| 23 | STANDARD | | 269.2846 | 5.5 | H-LAK10 | 41.13083 | 0 |
| 24 | STANDARD | | −101.0977 | 0.5 | | 4.025954 | 0 |
| 25 | STANDARD | | Infinity | 0.3 | BK7 | 37.9971 | 0 |
| 26 | STANDARD | | Infinity | 0 | | 37.89037 | 0 |
| IMA | STANDARD | | Infinity | | | 37.89037 | 0 |

In Table 5, the first row OBJ represents the design parameters related with the object plane; the third row STO represents a diaphragm in the optical system, the aperture of which is 9 mm; the fourth row and the fifth row represent a membrane consisting of a reflective polarizing plate and a first phase delay plate in the optical module, of which the type is STANDARD (standard plane), the material is BK7, the diameter is 30.18156 mm, and the aspheric coefficient is 0; the sixth row and the seventh row respectively represent the data corresponding to the first optical surface E1 and the second optical surface E2 of the first lens 10, the curvature radiuses of the first optical surface E1 and the second optical surface E2 are respectively infinite and −126.3604, the thickness of the first lens 10 is 4 mm (that is, the distance between the first optical surface E1 and the second optical surface E2, and the thickness value in the sixth row), and the material is H-LAK5 A; the eighth row and the ninth row respectively represent the data corresponding to the third optical surface E3 and the fourth optical surface E4 of the second lens 20, the curvature radiuses of the third optical surface E3 and the fourth optical surface E4 are respectively 252.9636 and 123.3701, the thickness of the second lens 20 is 1.5 mm (that is, the distance between the third optical surface E3 and the fourth optical surface E4, and the thickness value in the eighth row), and the material is H-ZF13. The tenth row and the eleventh row respectively represent the data corresponding to the fifth optical surface E5 and the sixth optical surface E6 of the third lens 30, the curvature radiuses of the fifth optical surface E5 and the sixth optical surface E6 are respectively 269.2846 and −101.0977, the thickness of the third lens 30 is 5.5 mm (that is, the distance between the fifth optical surface E5 and the sixth optical surface E6, and the thickness value in the tenth row), and the material is H-LAK10.

The twelfth row to the twenty-sixth row represent the relevant parameters in the reflection and transmission of light among the membrane, the first lens 10, the second lens 20 and the third lens 30. The twenty-seventh row represents the glass membrane in the liquid crystal layer of the display screen, of which the thickness is 0.3 mm, and the material is BK7. The twenty-eighth row IMA represents an image in the optical system.

Other corresponding parameters of the short-range optical amplification module are as shown in Table 6:

TABLE 6

| | |
|---|---|
| Screen size C (inch) | 2.1 |
| Field angle V (°) | 100 |
| System focal length F (mm) | 24 |
| Focal length of the transflective surface ($f_{s6}$) | 2.1 F |
| Eyebox A (mm) | 9 |
| Screen resolution | 4000*4000 |
| Optical system thickness (mm) | 16.3 |
| Eye relief (mm) | 9 |
| F# aperture | 2.7 |
| Optical outer diameter (mm) | 48 |
| System distortion D | 34% |
| First focal length $f_3$ of the third lens | 1.5 F |
| Focal length $f_2$ of the second lens | −5.0 F |
| Focal length $f_1$ of the first lens | 7.7 F |

Figure 11:
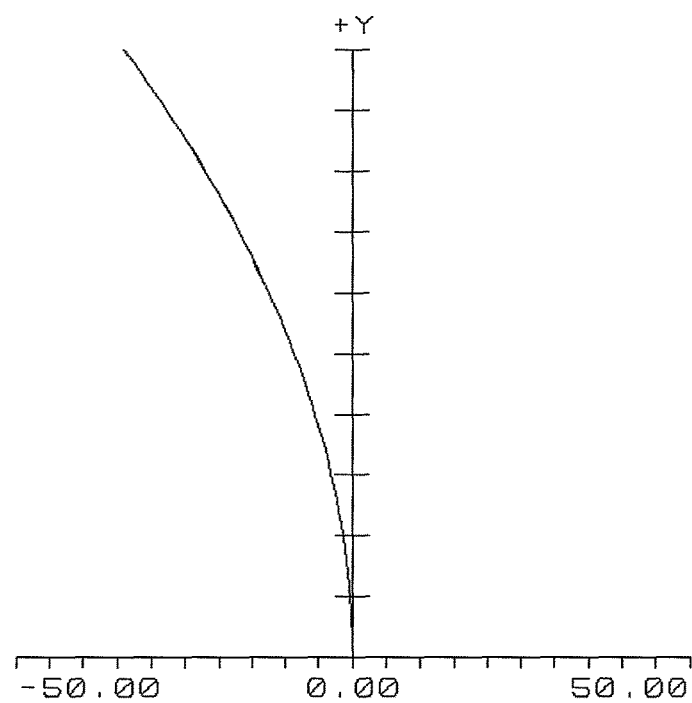
FIG. 11 is a distortion diagram of a short-range optical amplification module according to Embodiment 3 of the invention.
Figure 12:
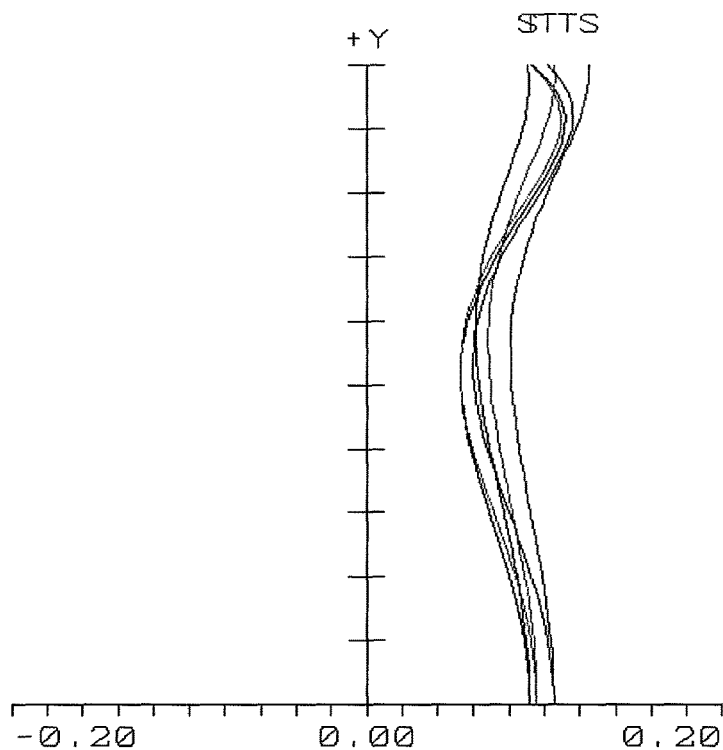
FIG. 12 is a field curvature diagram of a short-range optical amplification module according to Embodiment 3 of the invention.
Figure 13:
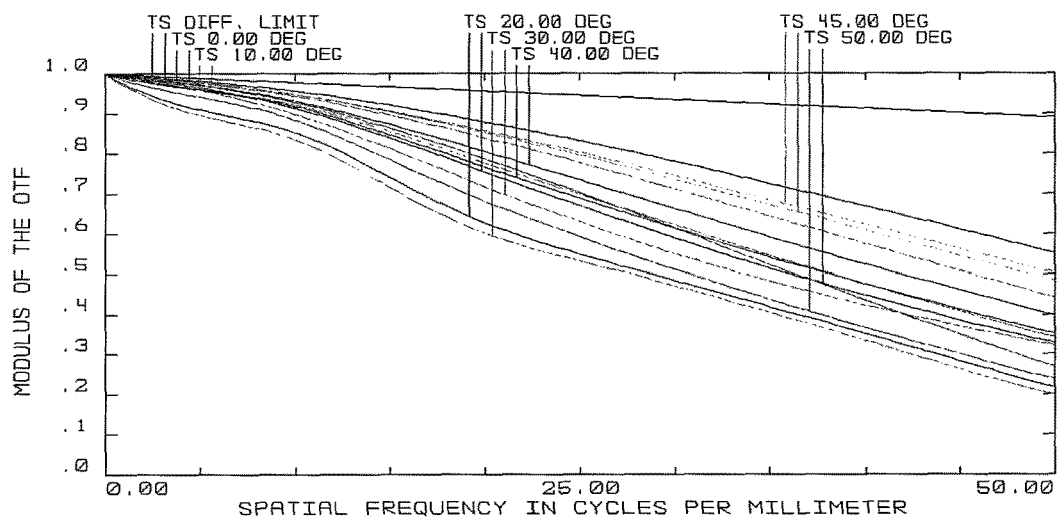
FIG. 13 is an MTF diagram of a short-range optical amplification module according to Embodiment 3 of the invention.

From the MTF diagram of FIG. 13, it may obtain the abscissa (spatial frequency per millimeter) value with an average ordinate (modulation transfer function) higher than 0.18 in each visual field, the distortion factor in FIG. 11 is controlled within a range of (−34%, 0), and the field curvature in FIG. 12 is controlled within the range of (−0.2 mm, 0.2 mm), thereby it may be obtained that the resolving power of the short-range optical amplification module may support a resolution of 400*400. That is, when the reflection surface-containing focal length of the third lens is 1.5F and the focal length $f_{S6}$ is 2.1F, the module can keep a small overall thickness while obtaining a large optical amplification effect, so that the module can be applied in a small-size VR device; moreover, the VR device can realize a wide field angle of 100°, a large eyebox of 9 mm, high-quality imaging effect with a screen resolution of 4000*4000, and hence a better user experience.

Embodiment 4

Figure 14:
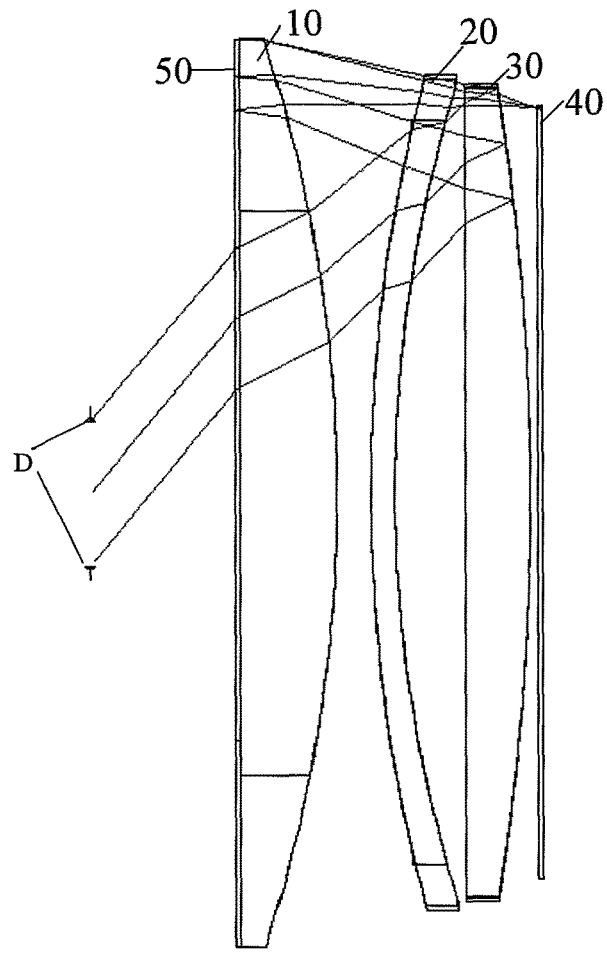
FIG. 14 is a diagram schematically showing the overall construction of a short-range optical amplification module according to Embodiment 4 of the invention.

As shown in FIG. 14, in the short-range optical amplification module, the reflection surface-containing focal length $f_3$ of the third lens 30 is designed as 2F (F is the system focal length).

The specific design parameters of the first lens 10, the second lens 20 and the third lens 30 are as shown in Table 7:

TABLE 7

| Surf | Type | Comment | Radius | Thickness | Glass | Diameter | Conic |
|---|---|---|---|---|---|---|---|
| OBJ | STANDARD | | Infinity | Infinity | | 0 | 0 |
| 1 | PARAXIAL | | — | 0 | | 9 | — |
| STO | STANDARD | | Infinity | 9 | | 9 | 0 |
| 3 | STANDARD | | Infinity | 0.3 | BK7 | 30.18156 | 0 |
| 4 | STANDARD | | Infinity | 0 | | 30.53068 | 0 |
| 5 | STANDARD | | Infinity | 6 | H-LAK5A | 30.53068 | 0 |
| 6 | STANDARD | | −90.62525 | 2.109238 | | 34.92428 | 0 |
| 7 | STANDARD | | 99 | 1.5 | H-ZF13 | 45.13135 | 0 |
| 8 | STANDARD | | 84.62125 | 4.411361 | | 46.09765 | 0 |
| 9 | STANDARD | | Infinity | 4 | H-LAK10 | 48.37239 | 0 |
| 10 | STANDARD | | −160 | −4 | MIRROR | 50.21346 | 0 |
| 11 | STANDARD | | Infinity | −4.411361 | | 50.67084 | 0 |
| 12 | STANDARD | | 84.62125 | −1.5 | H-ZF13 | 50.85978 | 0 |
| 13 | STANDARD | | 99 | −2.109238 | | 51.81457 | 0 |
| 14 | STANDARD | | −90.62525 | −6 | H-LAK5A | 56.27109 | 0 |
| 15 | STANDARD | | Infinity | 0 | | 56.24995 | 0 |
| 16 | STANDARD | | Infinity | −0.3 | BK7 | 56.24995 | 0 |
| 17 | STANDARD | | Infinity | 0.3 | MIRROR | 56.24534 | 0 |
| 18 | STANDARD | | Infinity | 0 | | 56.24073 | 0 |
| 19 | STANDARD | | Infinity | 6 | H-LAK5A | 56.24073 | 0 |
| 20 | STANDARD | | −90.62525 | 2.109238 | | 56.21948 | 0 |
| 21 | STANDARD | | 99 | 1.5 | H-ZF13 | 51.26091 | 0 |

TABLE 7-continued

| Surf | Type | Comment | Radius | Thickness | Glass | Diameter | Conic |
|---|---|---|---|---|---|---|---|
| 22 | STANDARD | | 84.62125 | 4.411361 | | 50.26115 | 0 |
| 23 | STANDARD | | Infinity | 4 | H-LAK10 | 50.00419 | 0 |
| 24 | STANDARD | | −160 | 0.5 | | 49.4669 | 0 |
| 25 | STANDARD | | Infinity | 0.3 | BK7 | 47.91431 | 0 |
| 26 | STANDARD | | Infinity | 0 | | 47.89222 | 0 |
| IMA | STANDARD | | Infinity | | | 47.89222 | 0 |

In Table 7, the first row OBJ represents the design parameters related with the object plane; the third row STO represents a diaphragm in the optical system, the aperture of which is 9 mm; the fourth row and the fifth row represent a membrane consisting of a reflective polarizing plate and a first phase delay plate in the optical module, of which the type is STANDARD (standard plane), the material is BK7, the diameter is 30.18156 mm, and the aspheric coefficient is 0; the sixth row and the seventh row respectively represent the data corresponding to the first optical surface E1 and the second optical surface E2 of the first lens 10, the curvature radiuses of the first optical surface E1 and the second optical surface E2 are respectively an Infinity plane and −90.62525, the thickness of the first lens 10 is 6 mm (that is, the distance between the first optical surface E1 and the second optical surface E2, and the thickness value in the sixth row), and the material is H-LAK5A; the eighth row and the ninth row respectively represent the data corresponding to the third optical surface E3 and the fourth optical surface E4 of the second lens 20, the curvature radiuses of the third optical surface E3 and the fourth optical surface E4 are respectively 99 and 84.62125, the thickness of the second lens 20 is 1.5 mm (that is, the distance between the third optical surface E3 and the fourth optical surface E4, and the thickness value in the eighth row), and the material is H-ZF13. The tenth row and the eleventh row respectively represent the data corresponding to the fifth optical surface E5 and the sixth optical surface E6 of the third lens 30, the curvature radiuses of the fifth optical surface E5 and the sixth optical surface E6 are respectively infinite and −160, the thickness of the third lens 30 is 4 mm (that is, the distance between the fifth optical surface E5 and the sixth optical surface E6, and the thickness value in the tenth row), and the material is H-LAK10.

The twelfth row to the twenty-sixth row represent the relevant parameters in the reflection and transmission of light among the membrane, the first lens 10, the second lens 20 and the third lens 30. The twenty-seventh row represents the glass membrane in the liquid crystal layer of the display screen, of which the thickness is 0.3 mm, and the material is BK7; the twenty-eighth row IMA represents an image in the optical system.

Other corresponding parameters of the short-range optical amplification module are as shown in Table 8:

TABLE 8

| | |
|---|---|
| Screen size c (inch) | 2.7 |
| Field angle v (°) | 100 |
| System focal length f (mm) | 30 |
| Focal length of the transflective surface ($f_{s6}$) | 2.67 f |
| Eyebox A (mm) | 9 |
| Screen resolution | 1200*1200 |
| Optical system thickness (mm) | 19 |
| Eye relief (mm) | 9 |
| F# aperture | 3.3 |
| Optical outer diameter (mm) | 58 |

TABLE 8-continued

| | |
|---|---|
| System distortion d | 33.6% |
| First focal length $f_3$ of the third lens | 2 f |
| Focal length $f_2$ of the second lens | −25.6 f |
| Focal length $f_1$ of the first lens | 4.4 f |

Figure 15:
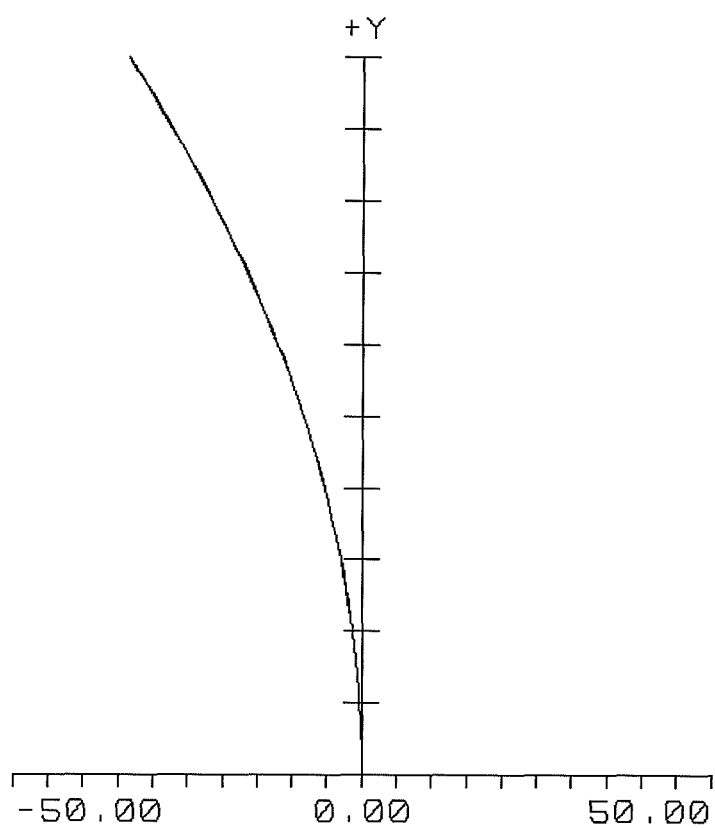
FIG. 15 is a distortion diagram of a short-range optical amplification module according to Embodiment 4 of the invention.
Figure 16:
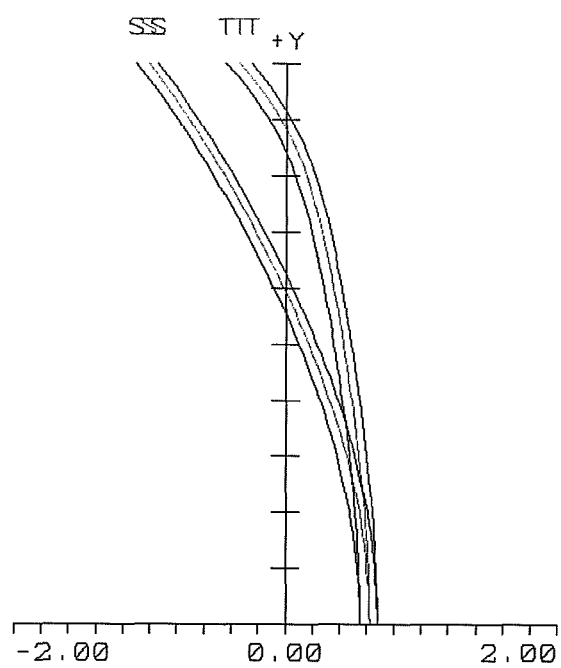
FIG. 16 is a field curvature diagram of a short-range optical amplification module according to Embodiment 4 of the invention.
Figure 17:
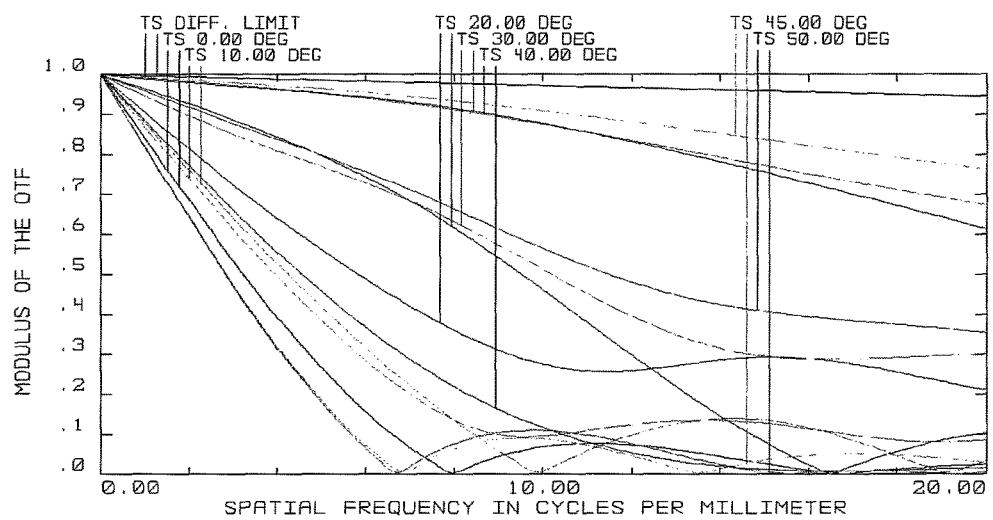
FIG. 17 is an MTF diagram of a short-range optical amplification module according to Embodiment 4 of the invention.

From the MTF diagram of FIG. 17, it may obtain the abscissa (spatial frequency per millimeter) value with an average ordinate (modulation transfer function) higher than 0.18 in each visual field, the distortion factor in FIG. 15 is controlled within a range of (−33.6%, 0), and the field curvature in FIG. 16 is controlled within the range of (−2 mm, 2 mm), thereby it may be obtained that the resolving power of the short-range optical amplification module may support a resolution of 400*400. That is, when the reflection surface-containing focal length of the third lens is 2F and the focal length $f_{S6}$ is 2.67F, the module can keep a small overall thickness while obtaining a large optical amplification effect, so that the module can be applied in a small-size VR device; moreover, the VR device can realize a wide field angle of 100°, a large eyebox of 9 mm, high-quality imaging effect with a screen resolution of 1200*1200, and hence a better user experience. Furthermore, it needs to be pointed out that, when the reflection surface-containing focal length of the third lens is 2F, the focal length $f_{S6}$ does not have to be set as 2.67F. All the above technical objects can still be realized by adjusting the focal length of the first lens and/or the focal length of the second lens and keeping $f_{S6}$ in an range of 1F-5F.

It should be noted that the ordinal adjectives such as "first" and "second" employed herein are only used for distinguishing one entity or operation from another entity or operation, rather than requiring or implying that these entities or operations must have certain relations or be in a given sequence. Moreover, the terms "include", "comprise" or any other variations thereof intend to encompass nonexclusive inclusion, so that a process, a method, an object or a device that are said to include a series of essential factors not only include such essential factors, but also include other essential factors that are not listed specifically or essential factors inherent in such a process, method, object or device. In the case of no other limitation, an essential factor defined by a sentence "includes a . . . " does not exclude that additional similar essential factors may exist in the process, method, object or device that includes said essential factor.

The above description only shows some specific embodiments of the present invention, so that one skilled in the art can understand or implement the invention. Various modifications to these embodiments are apparent to those skilled in the art. The general principles defined herein may be implemented in other embodiments without departing from the spirit or scope of the invention. Therefore, the invention will not be limited to the embodiments described herein;

instead, the invention conforms to the widest scope that is consistent with the principles and novel features disclosed herein.

The above description only shows some specific embodiments of the invention. It should be pointed out that, various improvements and modifications may also be made without departing from the principles of the invention, and all these improvements and modifications should be construed as falling into the protection scope of the invention.

What is claimed is:

1. A short-range optical amplification module, comprising, sequentially from the image side to the object side: a reflective polarizing plate, a first phase delay plate, a third lens and a second phase delay plate, wherein, the short-range optical amplification module further comprises: (1) a first lens that is located on either side of any one of the reflective polarizing plate, the first phase delay plate, the third lens and the second phase delay plate, and (2) a second lens that is located on either side of any one of the reflective polarizing plate, the first phase delay plate, the third lens and the second phase delay plate, wherein, in the third lens, the optical surface adjacent to the second phase delay plate is a transflective optical surface, and a first focal length $f_3$ of the third lens meets the following condition: $1F \leq f_3 \leq 2F$, wherein F is a focal length of the short-range optical amplification module.

2. The short-range optical amplification module according to claim 1, wherein the first focal length $f_3$ of the third lens meets the following condition: $1.5F \leq f_3 \leq 2F$.

3. The short-range optical amplification module according to claim 1, wherein a focal length $f_{S6}$ of the transflective optical surface meets the following condition: $1.5F \leq f_{S6} \leq 235 F$.

4. The short-range optical amplification module according to claim 1, wherein, in the third lens, a focal length $f_{S5}$ of the optical surface adjacent to the second lens meets the following condition: $|f_{S5}| \geq 2F$.

5. The short-range optical amplification module according to claim 1, wherein the focal length F consists of the first lens, the second lens and the third lens and meets the following condition: $10 \text{ mm} \leq F \leq 32 \text{ mm}$.

6. The short-range optical amplification module according to claim 1, wherein a focal length $f_2$ of the second lens meets the following condition: $2F \leq -f_2$.

7. The short-range optical amplification module according to claim 1, wherein, in the second lens, a focal length $f_{S3}$ of the optical surface adjacent to the first lens meets the following condition: $|f_{S3}| \geq 2F$.

8. The short-range optical amplification module according to claim 1, wherein, in the second lens, a focal length $f_{S4}$ of the optical surface adjacent to the third lens meets the following condition: $|f_{S4}| \geq 2F$.

9. The short-range optical amplification module according to claim 1, wherein a focal length $f_1$ of the first lens meets the following condition: $4F \leq f_1$.

10. The short-range optical amplification module according to claim 1, wherein, in the first lens, a focal length $f_{S2}$ of the optical surface adjacent to the second lens is equal to a focal length $f_1$ of the first lens.

11. The short-range optical amplification module according to claim 1, wherein a distance between an optical surface of the first lens, the second lens or the third lens, which is the most adjacent to the image side, and a screen surface on the object side is 8 mm~30 mm.

12. The short-range optical amplification module according to claim 1, wherein an aperture D, through which the light that takes part in imaging via the first lens, the second lens and the third lens passes, meets the following condition: $0.3F \leq D \leq 0.6F$.

13. The short-range optical amplification module according to claim 1, wherein a distance between an optical surface of the first lens, the second lens or the third lens, which is the most adjacent to the image side, and the human eye on the image side is 5~10 mm.

14. A pair of spectacles, comprising: the short-range optical amplification module according to claim 1, wherein the spectacles further comprise a display screen which is set coaxially or noncoaxially with the short-range optical amplification module.

15. A helmet, comprising: the short-range optical amplification module according to claim 1, wherein the helmet further comprises a display screen which is set coaxially or noncoaxially with the short-range optical amplification module.

16. A virtual reality system, comprising: the spectacles according to claim 14 or the helmet according to claim 15.

* * * * *